United States Patent
Brooks et al.

(10) Patent No.: US 6,498,655 B1
(45) Date of Patent: Dec. 24, 2002

(54) SELF VALIDATING PRINTER WITH TICKET VOIDING AND REPRINT FEATURES

(75) Inventors: Donald E. Brooks, Ithaca, NY (US); Bart C. Shuldman, Westport, CT (US); Mark B. Goebel, Chicopee, MA (US)

(73) Assignee: TransAct Technologies Incorporated, Wallingford, CT (US)

( * ) Notice: Subject to any disclaimer, the term of this patent is extended or adjusted under 35 U.S.C. 154(b) by 26 days.

(21) Appl. No.: 09/872,782

(22) Filed: Jun. 1, 2001

(51) Int. Cl.[7] .............................................. G06F 15/00
(52) U.S. Cl. .................... 358/1.12; 358/1.14; 358/1.18; 358/503; 235/375; 463/16; 463/29
(58) Field of Search ............................... 358/1.12, 1.14, 358/1.18, 503; 235/375, 440, 441; 463/17, 19, 25, 29, 16–20; 382/112, 141, 143; 283/57, 72, 83

(56) References Cited

U.S. PATENT DOCUMENTS

| | | | |
|---|---|---|---|
| 4,373,726 A | 2/1983 | Churchill et al. | 463/19 |
| 4,626,672 A | 12/1986 | Sapitowicz et al. | 235/480 |
| 4,704,518 A | 11/1987 | Brunn et al. | 235/480 |
| 4,788,419 A | 11/1988 | Walters et al. | 235/281 |
| 4,858,123 A | 8/1989 | Alexoff et al. | 101/484 |
| 4,859,839 A | 8/1989 | Tetelman et al. | 235/385 |
| 5,119,295 A | 6/1992 | Kapur | 463/41 |
| 5,173,596 A | 12/1992 | Kapinos et al. | 235/475 |
| 5,223,698 A | 6/1993 | Kapur | 235/375 |
| 5,483,048 A | 1/1996 | Kobayashi | 235/380 |
| 5,484,215 A | 1/1996 | Fillod et al. | 400/120.18 |
| 5,580,311 A | 12/1996 | Haste, III | 463/17 |
| 5,595,538 A | 1/1997 | Haste, III | 463/17 |
| 5,598,477 A | 1/1997 | Berson | 380/51 |
| 5,625,562 A | 4/1997 | Veeneman et al. | 700/235 |
| 5,682,819 A | 11/1997 | Beaty | 101/483 |
| 5,684,285 A | 11/1997 | Faes et al. | 235/449 |
| 6,012,832 A | 1/2000 | Saunders et al. | 235/280 |
| 6,048,269 A | 4/2000 | Burns et al. | 463/25 |
| 6,088,119 A | 7/2000 | Manchala et al. | 358/1.14 |
| 6,110,044 A | * 8/2000 | Stern | 463/29 |
| 6,280,326 B1 | 8/2001 | Saunders | 463/25 |
| 2001/0027126 A1 | 10/2001 | Saunders | |
| 2001/0034266 A1 | 10/2001 | Saunders | |

FOREIGN PATENT DOCUMENTS

WO    WO 94/16781    8/1994

OTHER PUBLICATIONS

GTECH Corporation, Proposal for Gaming Systems and Services for the Florida Lottery, Request for Proposals #95/96–001/R, including cover letter, proposal title page, table of contents; pp. 3.4–1, 3.4–2, 3.4–26 and 3.4–27, Dec. 15, 1995.

* cited by examiner

*Primary Examiner*—Mark Wallerson
*Assistant Examiner*—Twyler Lamb
(74) *Attorney, Agent, or Firm*—Barry R. Lipsitz

(57) ABSTRACT

Methods and apparatus are provided for printing and validating a document, such as a ticket or voucher printed on a substrate such as paper. After the document is printed, at least a portion thereof is read to test a validity criteria. The document is dispensed to a recipient if the validity criteria is met. If the validity criteria is not met after the first read, the document can optionally be re-read. If the validity criteria is never met, the document is voided. The voided document is then dispensed to the recipient and a replacement document is immediately printed, read for validation purposes and dispensed. If the replacement document is not valid, it is voided prior to dispensing. Assistance from a machine attendant is required only in the event that a predetermined number of invalid print/read/validate cycles occur.

26 Claims, 5 Drawing Sheets

SELF VALIDATING PRINTER WITH TICKET VOIDING AND REPRINT FEATURES

BACKGROUND OF THE INVENTION

The present invention relates generally to printers and paper transport mechanisms, and more particularly to a ticket printer with reading, validating, paper transport and reprint features. Such printers are particularly well suited for use in gaming machines, vending machines, point-of-sale (POS) terminals, transportation and entertainment ticket machines, and the like.

Ticket or voucher printers are useful in a variety of applications. One such application is to print coded tickets or vouchers used in lottery terminals, slot machines and other self-service wagering apparatus. While various printer technologies are well known, such as inkjet and laser printers, thermal printers are currently preferred in such applications for their speed and reliability. Accordingly, the present invention will be described in connection with a thermal printing implementation, although it should be understood that this is by way of example only, and virtually any other type of printer may be used in implementing the invention.

Various printer systems have been proposed for use in self-service terminals, such as for cashless gaming systems used, e.g., at casinos and racetracks. In such systems, a ticket (alternatively referred to herein as a "voucher") is provided to the gaming patron for use instead of, e.g., tokens, cash, debit cards and credit cards. It is well known to use tokens in gambling casinos. For example, in a typical gaming machine environment, a player inserts coins or tokens and plays the game. When the player is finished and has a winning cash amount, a cash-out button is pressed and the appropriate number of coins or tokens is dispensed in a cash out bin. It is awkward, however, to deal with such tokens and to cash them in before leaving the casino.

The use of credit and debit cards has been proposed as an alternative to tokens. However, there has existed a strong public policy against allowing persons to be able to access their full credit limit for gambling purposes.

Other approaches have used magnetically striped cards in which a cash value is stored. Such cards (sometimes also referred to as vouchers or tickets) have been used in gaming systems as well as in transportation systems, particularly various subway systems. Once the cash value of the card is used up it can be refilled, or the card can be discarded and a new one purchased.

U.S. Pat. No. 6,012,832 to Saunders et al. issued on Jan. 11, 2000 for "Cashless Peripheral Device For A Gaming System" discloses, as part of a gaming system, a ticket printer that prints a coded value, such as a bar code, on a ticket in response to a cash-out signal from the gaming system. The ticket is then passed to a reader which reads the coded value printed on the ticket. If the printed value corresponds to the value which should have been printed, a ticket-out transport delivers the printed ticket to the player cashing out from the gaming system. However, if the printed value does not correspond to the correct value, the ticket is held without dispensing to the player. Instead, the ticket is held in place by the ticket-out transport, a message is displayed that a malfunction has occurred, and an alarm message is delivered to summon an attendant to immediately visit the machine. The invalid ticket is firmly held to prevent the player from receiving it.

The system described in the '832 patent requires attention by an attendant any time the coded value read from the just printed ticket does not match the value that was supposed to be printed. There is no way to determine if the reader simply incorrectly read the coded value, or if the coded value is really wrong. Moreover, there is no way for a patron to receive the ticket once the reader determines (correctly or incorrectly) that the coded value is wrong. Absent direct attention from an attendant (who has to open the machine, diagnose the problem, and deal with a customer who may be is aggravated and become upset that valuable time is being wasted), there is no way to recover from a malfunction (which may be something as simple as an incorrect reading of a valid coded value). Still further, the gaming machine will be out of commission while the attendant is being summoned and is fixing the machine. This will cause the machine owner to lose revenue, which can add up to a significant amount over time, particularly in facilities that operate a large number of such gaming machines.

It would be advantageous to provide a better way for validating tickets, vouchers or the like after printing without the need to shut down the terminal using the printer immediately after an initial invalidity determination. It would be further advantageous to provide a printer for gaming machines, vending machines and other terminals that print tickets, vouchers or the like, that has the ability to overcome apparent printing errors without summoning an attendant in the first instance. It would be still further advantageous to provide a method for printing and validating, as well as associated printer apparatus, that enables tickets, vouchers or the like which are found to be invalid to be immediately voided and replaced.

The present invention provides a printer and associated methods for printing, validating, voiding, and replacing substrates of value, all having the above and other advantages.

SUMMARY OF THE INVENTION

In accordance with the present invention, methods are provided for printing and validating a document, such as a ticket or voucher printed on a substrate such as paper. After the document is printed, at least a portion thereof is read to test a validity criteria. The document is dispensed to a recipient if the validity criteria is met. If the validity criteria is not met, the document is voided and, in the illustrated embodiment, dispensed to the recipient A replacement document is then immediately printed for the recipient.

In a preferred embodiment, at least a portion of the replacement document is read to test a validity criteria of thereof. The replacement document is dispensed to the recipient if the validity criteria for the replacement document is met. If the validity criteria for the replacement document is not met, an alarm, is generated. The alarm may be an audible alarm to notify an attendant that assistance is required, a displayed message on the terminal or at a central station, an automatic page for an attendant, or the like. Any combination of the aforementioned and other alarm methods may also be used.

The preferred embodiment also voids the replacement document if the validity criteria is not met. The voided replacement document is then dispensed to the recipient.

The reading step can be repeated for at least one of the document or the replacement document at least once before the document is voided. In this manner, the document for which the reading step has been repeated can be dispensed to the recipient as a valid document if the validity criteria is met after a repeated reading step. On the other hand, if the document is not found to be valid on the final re-read, it is voided. In a preferred embodiment, the portion of the document which is read to test the validity criteria comprises a bi-directional code, such as a bar code. The re-reading of the bi-directional code during the repeating step can therefore be performed in an opposite direction than the initial reading of the code.

The voiding step can, for example, void the document by printing voiding indicia thereon. The voiding indicia can either partially or completely obliterate a bar code, for example, or can print the word VOID across the document in a manner which will prevent any further use thereof. In a preferred embodiment, the recipient is notified to wait for a replacement document if a voided document is dispensed. For example, a message display on the terminal may provide such notification. Alternatively, the voiding of the prior document can include printing a message thereon which instructs the recipient to wait for a replacement document. The document can comprise, e.g., a wagering ticket or voucher, a ticket for admission to an event, or a ticket for use in a pubic transportation system.

Printer apparatus is also disclosed in accordance with the present invention. The printer has document verification, dispensing and voiding features, and includes various components, including a transport, a print module and a read module. The print module is used to print indicia on a substrate (e.g., paper) carried by the transport. The read module reads at least a portion of the indicia to test a validity criteria. The transport dispenses the printed substrate to a recipient if the validity criteria is met, transports the printed substrate to be voided if the validity criteria is not met, dispenses the voided substrate to the recipient, and transports a replacement substrate for printing and reading in the event the validity criteria is not met for the previous printed substrate.

In an illustrated embodiment of the invention, the transport transports the printed substrate back to the print module, if necessary, to be voided. For example, the transport can be a bi-directional transport, which reverses direction to transport the substrate back to the print module. The print module then voids the substrate by printing voiding indicia thereon.

An alarm module can be provided to generate an alarm (e.g., an audio or visual alarm, automatic page, or text message) in the event a printed replacement substrate does not meet the validity criteria. In an example implementation, if the printed replacement substrate does not meet the validity criteria, the transport transports the printed replacement substrate to be voided and dispenses the voided replacement substrate to the recipient. The alarm can also or alternatively be generated when a voided replacement substrate is dispensed. It should be appreciated that the printer system itself may not include an alarm module, but may merely send a control signal to the system (e.g., gaming terminal) that uses the printer, or to a central device that generates an appropriate alarm or the like.

The read module can be implemented to re-read at least one of said substrate or the replacement substrate prior to voiding same. The transport can then dispense the re-read substrate to the recipient as a valid substrate if the validity criteria is met upon the re-reading.

A notifying module can be provided to notify the recipient to wait for the replacement substrate if a voided substrate is dispensed. In one implementation, the notification is printed on said voided substrate. Notification can also be made by way of a text message (e.g., on a video monitor), audio or visual signal, or the like. As with the alarm module, the notifying module does not have to be part of the printer system itself. Instead, the printer can simply generate a signal for actuation of an external notifying device.

In the illustrated embodiment, the print module comprises a thermal print head and the substrate comprises thermal print paper. It should be appreciated, however, that the invention is not limited to any particular type of printer or substrate. Moreover, without limitation, the printed substrate can be a wagering ticket or voucher and the read module can comprise a bar code reader.

DETAILED DESCRIPTION OF THE INVENTION

The present invention relates to the printing and validating of tickets, vouchers and the like having a cash or cash-equivalent value for dispensing to customers. The invention can be implemented in any suitable printer technology, such as thermal, inkjet, laser or the like. In the following description, the invention is described in connection with a thermal printer, such as those manufactured by the assignee TransAct Technologies Incorporated of Wallingford, Conn., U.S.A. for use in gaming machines, vending machines, self-service ticket terminals, and the like.

Figure 1:
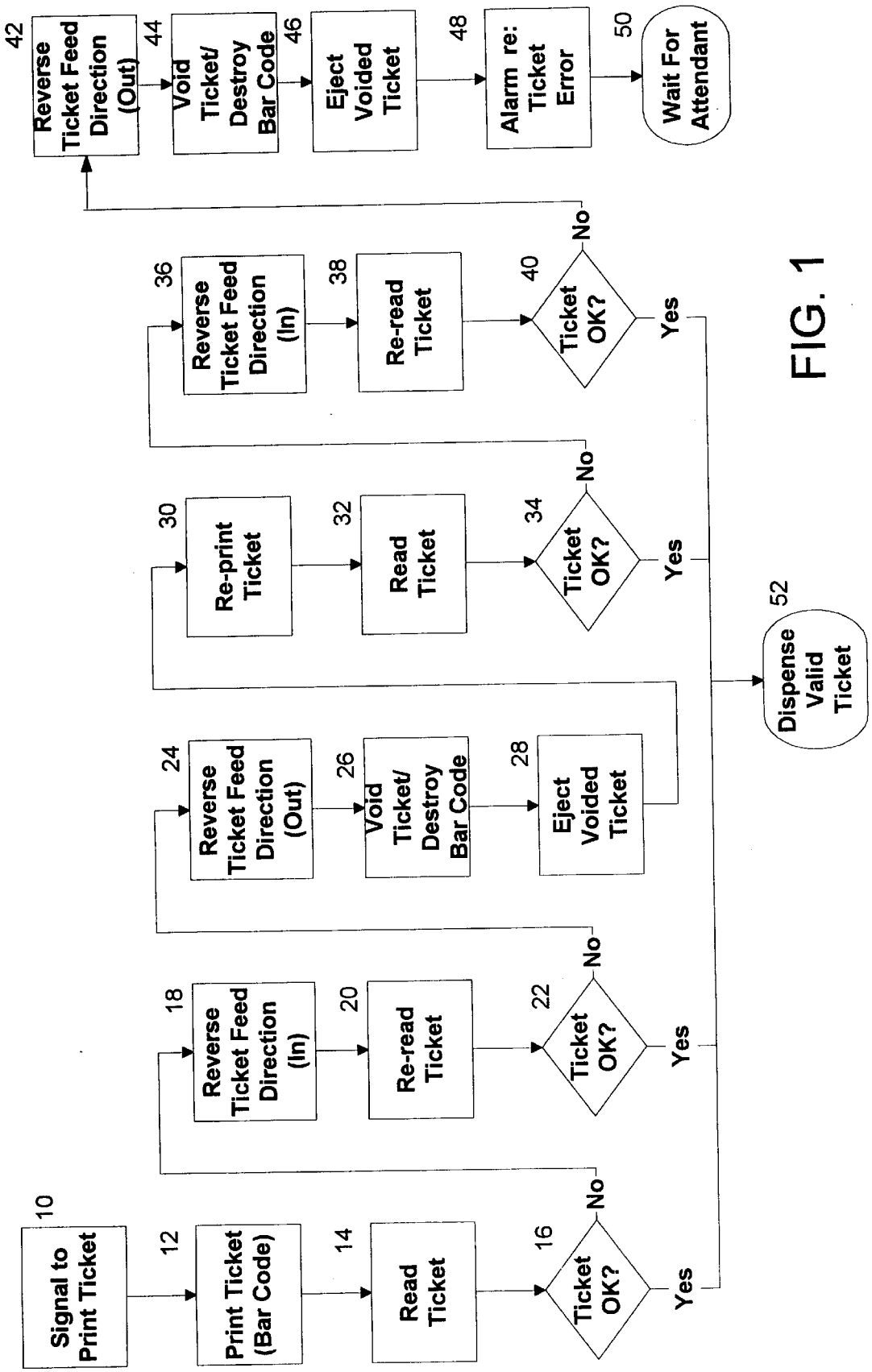
FIG. 1 is a flow chart illustrating a document printing, validating and dispensing process in accordance with the present invention.

FIG. 1 is a flowchart illustrating the operation of a printer or printing system (e.g., for a ticket issuing terminal or the like) in accordance with the invention. It is noted that the term "ticket" as used herein is intended to include any type of ticket, voucher or similar item of value printed on a substrate. A printer receives a signal to print a ticket, as indicated at box 10. The ticket is printed with indicia such as text and a printed code, as shown at box 12. The printed code can be, for example, a bar code or other digital code known in the art. Preferably, a bi-directional code will be used, such as a bar code that can be read by scanning in either longitudinal direction.

At box 14, at least a portion of the printed ticket is read (e.g., a bar coded portion read by a bar code scanner) to test a validity criteria. The validity criteria can simply require that a printed bar code have a value (e.g., a cash value or other numerical or coded value) that matches a value or a number that the printer was instructed to print. If the validity criteria is found to be met at box 16 ("Ticket OK"), the printed ticket is dispensed to a recipient (box 52), such as a player at a gaming terminal or a customer at a self-service ticketing terminal.

In the event that the validity criteria is not met at box 16, control flows to box 18 where the substrate on which the ticket is printed is caused to be fed in a reverse direction, toward the input side of the terminal. This can be accomplished by using a substrate transport (e.g., paper transport) mechanism that is reversible, such as a transport driven by a D.C. stepper motor and electronic controller as well known in the art. While the ticket is being transported in the reverse direction, it is again read as indicated at box 20 (preferably by the same reader used to read the ticket at box 14), but this time in a reverse direction. The use of a bi-directional code on the ticket as mentioned above is, of course, necessary to allow reading in the reverse direction. If a code which is not bi-directional is used, the portion of the ticket to be re-read will have to be transported to a point before the reader so that the reader can re-read the ticket in the same direction in which it was initially read.

If the validity criteria is found to be met when the ticket is re-read (box 22), the ticket is dispensed to the recipient as indicated at box 52. In the event that the re-reading of the ticket was performed in the reverse direction (i.e., in a feed direction toward the input of the printer), the transport will have to be reversed again in order to dispense the ticket from the output side of the printer.

If the validity criteria is not found to be met at box 22, the ticket feed direction is reversed (toward the output side of the terminal) as indicated at box 24, and the ticket is voided as indicated at box 26. The voiding can be performed, for example, by destroying a bar code on the ticket by over-printing, perforation, or the like. Where an over-printing technique is used, the same print head used to print the ticket at box 12 can be used. In an implementation where the print head is stationary and the substrate is moved, the ticket will be reversed far enough back through the printer, so that the printer can re-print over the bar code. Alternatively, a separate printer downstream from the first printer could be provided, or a perforator module could be provided to perforate the ticket to void it. These alternative options are less desirable, however, as they will add cost to the printer system.

At box 28, the voided ticket is ejected to the recipient. In the preferred embodiment, the same slot is used to dispense a valid ticket or eject a voided ticket. However, a separate slot could be provided for the ejection of voided tickets.

After a voided ticket is ejected (or concurrent with the ejection process), a new ticket is immediately printed as indicated at box 30. Preferably, the customer is notified that the replacement ticket is on its way, either by an electronic display on the terminal, an audible signal, or a printed message on the voided ticket. Such a printed message can be produced at the same time the printer is voiding the ticket. The replacement (i.e., "re-printed") ticket is read (box 32) in the same manner that the original ticket was read at box 14. If the replacement ticket is okay, as determined at box 34, it is dispensed at box 52 to the customer. Otherwise, the process described for the original ticket at boxes 18, 20 and 22 is performed on the replacement ticket at boxes 36, 38 and 40. In the event the replacement ticket is found to be invalid at box 40, it is reversed at box 42 (e.g., back into the printer as described above in connection with box 24) and voided at box 44 as described above in connection with box 26. The voided ticket is then ejected as indicated at box 46 (as described in connection with box 28). An alarm is then provided to summon an attendant or inform a system operator that the terminal has malfunctioned, as indicated at box 48. An attendant is then dispatched to correct the problem (box 50).

FIGS. 2 through 6 illustrate an example thermal printer assembly that can be used to implement the invention. It should be appreciated that the illustrated printer is for purposes of example only, and that other printers and printer types can also be used to implement the present invention.

Figure 2:
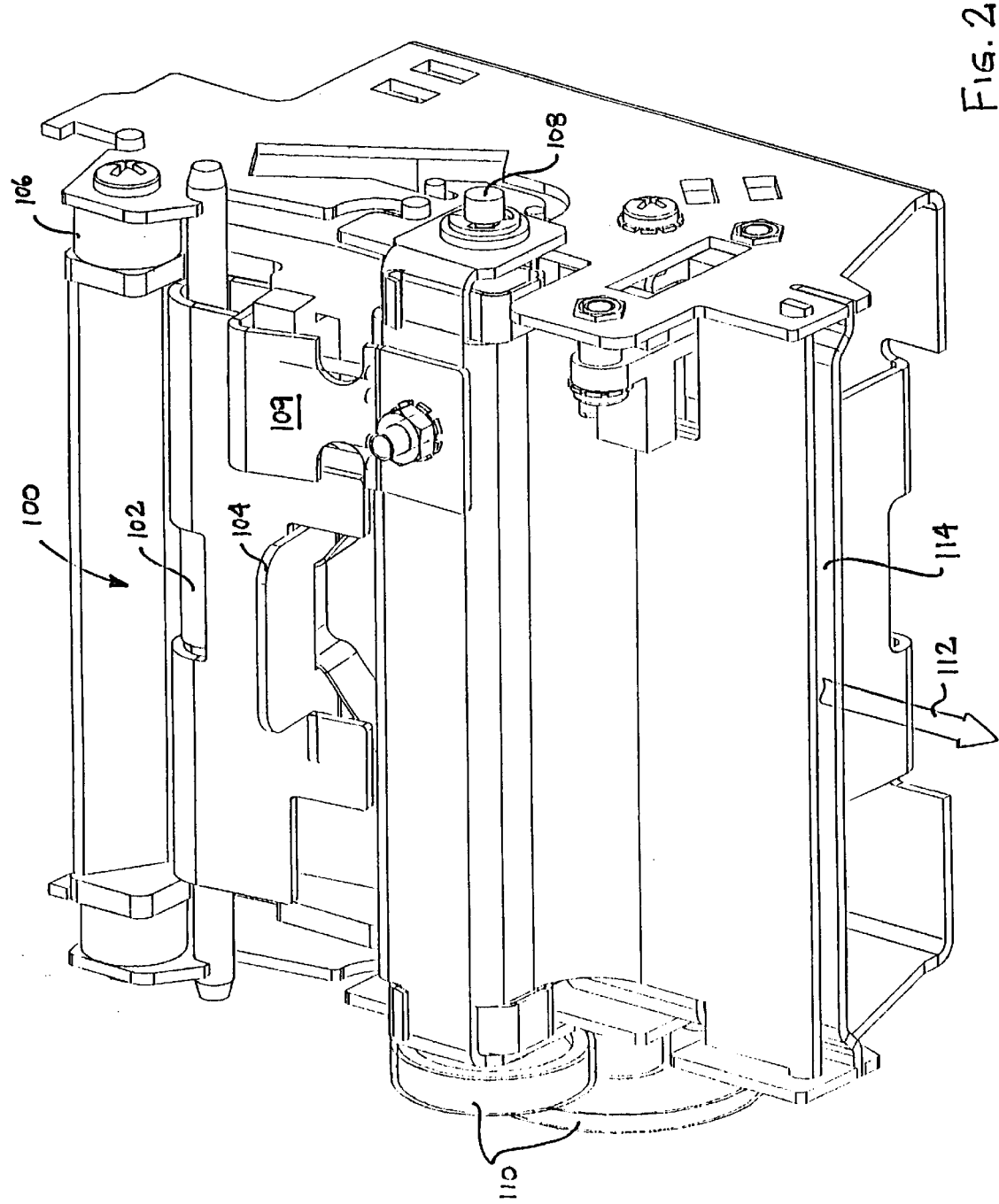
FIG. 2 is a top, front and right side perspective view of an example printer that can be used in accordance with the invention.
Figure 3:
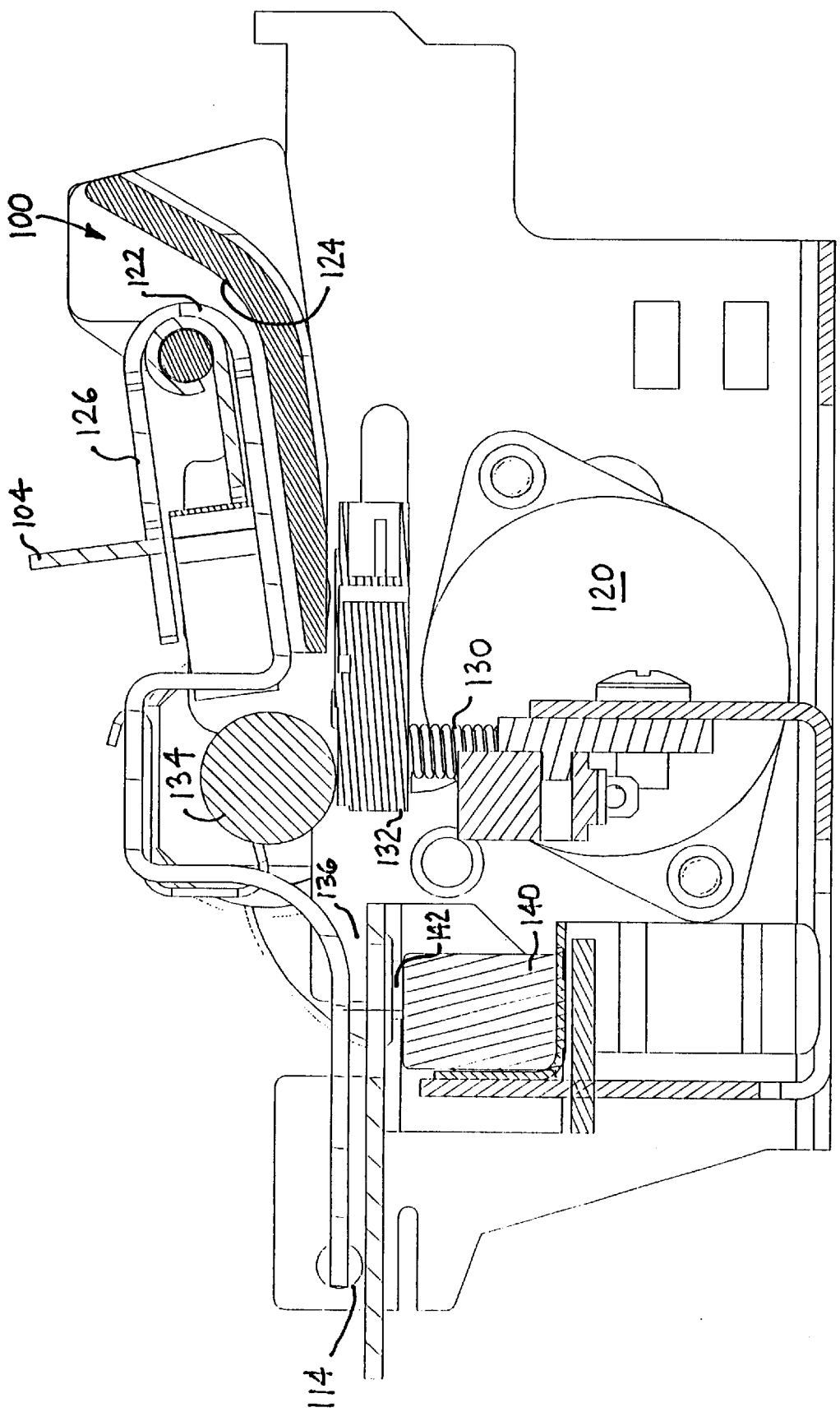
FIG. 3 is a cross-sectional view of the printer of FIG. 2, showing various paper feed, print and read components thereof.
Figure 4:
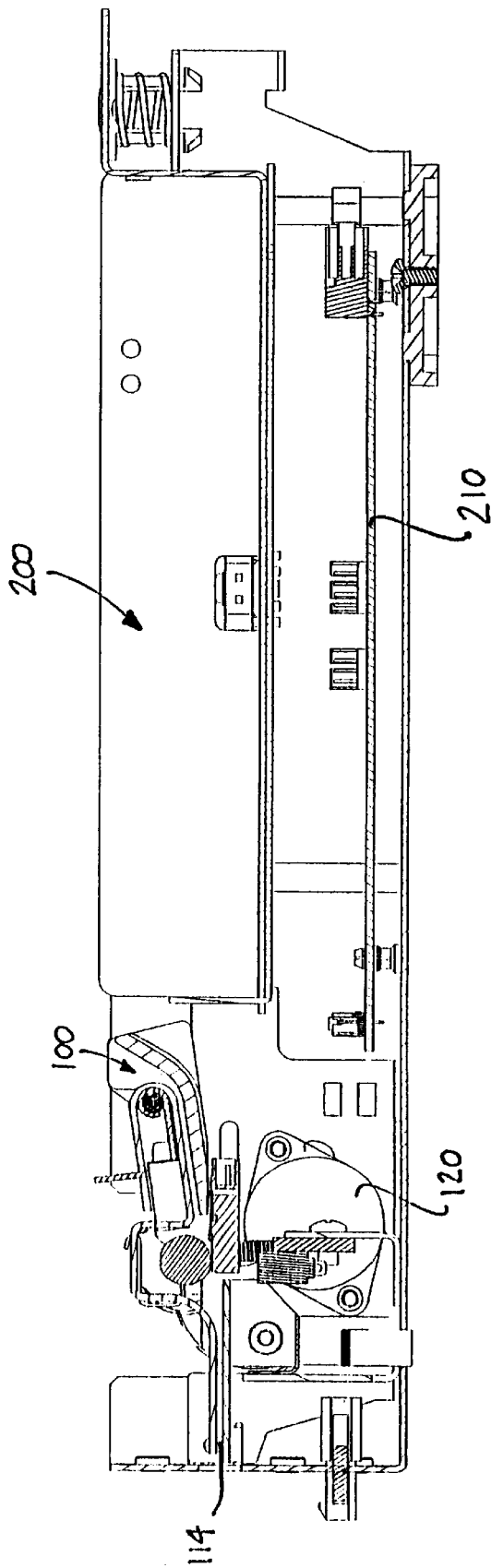
FIG. 4 is a cross-sectional view of the printer of FIG. 2, including an extending paper tray and control board assembly with associated structural components, taken along the line A—A of FIG. 5.

As best illustrated in FIGS. 2 to 4, a paper input chute 100 is provided for receiving paper, which may be in fanfold form, from a paper tray 200. The printer may also be configured to receive individual paper sheets (e.g., ticket stock) by using a sheet feed paper tray, usually provided at an angle above paper chute 100, in a conventional manner. A top of form sensor is provided under cover 109 (FIG. 2) to detect and register the paper substrate as it progresses past the chute 100 and further into the printer. The top of form sensor can read a pre-printed mark on the paper substrate, or can optically detect the leading edge of the paper as well known in the art. A latch 104 is provided to allow the printer to be opened to clear paper jams and for other maintenance needs.

Drive mechanism 106, which may be a gear or belt driven assembly, rotates a pressure roller assembly 102 for driving the paper introduced into chute 100 into the printer. As best seen in FIG. 3, paper driven by roller 102 is inserted between a paper entry portion 122 of an upper paper path guide assembly 126 and a corresponding lower paper path guide assembly 124. The paper is directed by the upper and lower guide assemblies to a platen 134, made of a resilient material such as rubber, silicone, or the like. Platen 134 provides a printing surface for a thermal print head 132, which is biased against the platen by a spring 130. The print head 132 prints indicia, such as text and a bar code or the like, on the paper substrate as it passes between the print head and platen. A stepper motor 120 is used together with various drive assemblies to transport the paper substrate through the printer by driving roller 102, as described above, as well as platen 134, which is rotatable along the axis of a shaft 108 via drive assembly 110. The drive assembly 110 is typically gear driven, but may also be belt driven, or may use a combination of belts and gears as well known in the art.

In accordance with the invention, stepper motor 120 is controllable to transport the paper, be it fanfold paper or single sheets such as ticket stock, bi-directionally. After the paper is printed, it is passed into an output chute 136 by rotating platen 134. The printing is then read by a read after print sensor 140 via opening 142. The sensor 140 is typically an optical sensor, but may alternatively be a magnetic sensor (in the event a magnetic code pattern is used) as well known in the art. Other well known sensor technologies may also be used. After reading the printed ticket for validation as described above in connection with FIG. 1, the stepper motor will either advance the paper (if validated) through an output slot 114 in the direction of arrow 112 (FIG. 2), or will reverse the paper so that it can be re-read by the sensor 140. If the printing (e.g., a printed bar code on the paper substrate) cannot be validated, the stepper motor 120 continues to advance the paper substrate back to the print head 132 so that the ticket can be voided. Then, the stepper motor reverses the transport direction again and ejects the voided ticket from the output slot 114. At the same time, a new sheet of paper is advanced into the printer so that a replacement ticket can be printed, validated and if valid, dispensed through the output slot 114. In the event that the second (or subsequent, depending on the implementation) ticket is invalid, an error message is generated for triggering an alarm or the like to summon an attendant to the terminal for repair.

The printer is controlled by a control board 210 shown in FIG. 4. This board contains the processing and logic components necessary to implement the flowchart of FIG. 1. In a preferred embodiment, the control board will contain memory such as programmable read only memory (PROM) for storing firmware that controls an on-board microcontroller. The control board can also contain hardware, logic, software and/or firmware to implement a notifying module. This module provides notification to a user of the terminal in which the printer is installed, to wait for a replacement ticket if a voided ticket is dispensed. Such notification can be provided on the voided ticket itself, on a display on the terminal, as an audio signal, or in any other manner. An alarm module can also be implemented on the control board, again through hardware, logic, software, firmware, or any combination thereof, in order to indicate that a voided replacement ticket has been dispensed and that the printer requires attention from a human attendant. A display driver and other typical controller circuitry can also be provided on the control board 210. In an alternate embodiment, all or part of the control functions and software/firmware therefor could be provided to the printer from a central server via a network.

Figure 5:
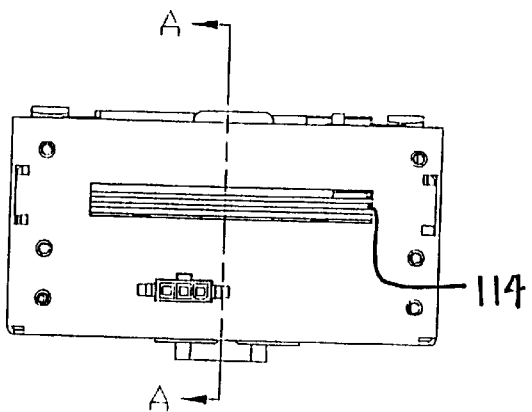
FIG. 5 is a front plan view of the printer of FIG. 2.
Figure 6:
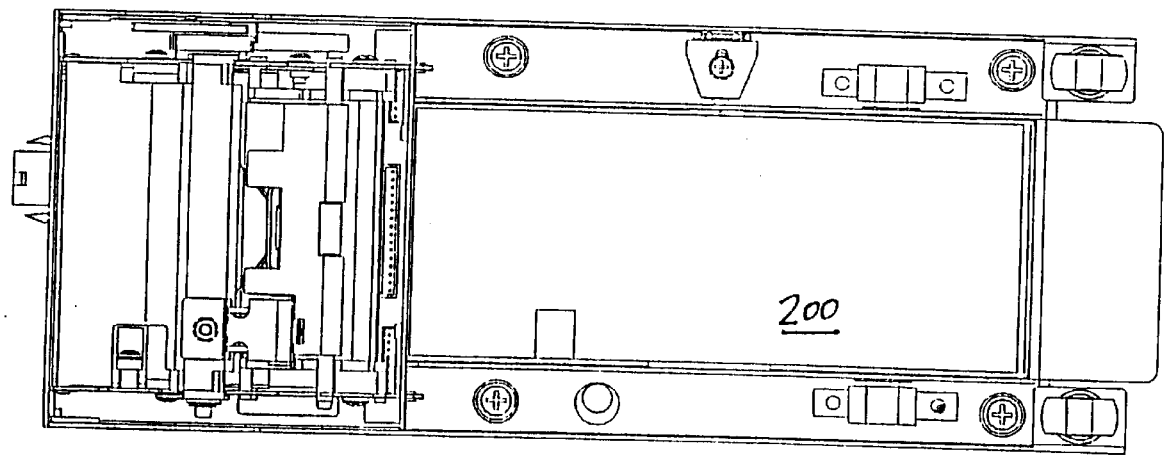
FIG. 6 is a top plan view of the printer and paper tray assembly of FIG. 4.

FIGS. 5 and 6 illustrate front and top plan views of the printer assembly and associated mounting structure. The printer is adapted to be mounted in a terminal, such as a self-service ticket machine, vending machine, or a gaming machine, in a conventional manner.

It should now be appreciated that the present invention provides methods and apparatus for printing, validating, and if necessary voiding and reprinting tickets, vouchers and the like. Original, voided and replacement tickets, when generated, are all dispensed to the user, reducing downtime of the system using the printer and reducing the need for human intervention from an attendant in the event of infrequent printing errors.

Although the invention has been described in connection with various specific embodiments, it should be appreciated that numerous adaptations and modifications may be made thereto without departing from the spirit and scope of the invention as set forth in the claims.

What is claimed is:

1. A method for printing and validating a document, comprising the steps of:
   printing said document;
   reading at least a portion of said document to test a validity criteria;
   dispensing said document to a recipient if said validity criteria is met; and, if said validity criteria is not met:
   (i) voiding said document;
   (ii) dispensing said voided document to said recipient; and
   (iii) immediately printing a replacement document for said recipient.

2. A method in accordance with claim 1, comprising:
   reading at least a portion of said replacement document to test a validity criteria of thereof;
   dispensing said replacement document to a recipient if the validity criteria for the replacement document is met; and
   generating an alarm if the validity criteria for the replacement document is not met.

3. A method in accordance with claim 2, comprising:
   voiding the replacement document if the validity criteria is not met; and
   dispensing the voided replacement document to said recipient.

4. A method in accordance with claim 2, comprising:
   repeating the reading step for at least one of said document or said replacement document at least once prior to voiding;
   wherein the document for which the reading step has been repeated is dispensed to said recipient as a valid document if the validity criteria is met upon the repeated reading step.

5. A method in accordance with claim 1, comprising:
   repeating the reading step at least once prior to voiding said document;
   wherein the document is dispensed to said recipient as a valid document if the validity criteria is met upon the repeated reading step.

6. A method in accordance with claim 5, wherein:
   the portion of said document which is read to test the validity criteria comprises a bi-directional code; and
   the reading of said bi-directional code during the repeating step is performed in an opposite direction as the initial reading of the code.

7. A method in accordance with claim 1 wherein said voiding step voids said document by printing voiding indicia thereon.

8. A method in accordance with claim 1, wherein said recipient is notified to wait for said replacement document if a voided document is dispensed.

9. A method in accordance with claim 1 wherein said document is a wagering ticket or voucher.

10. A printer with document verification, dispensing and voiding features, comprising:
    a transport;
    a print module for printing indicia on a substrate carried by said transport;
    a read module for reading at least a portion of said indicia to test a validity criteria;
    wherein said transport:
    dispenses said printed substrate to a recipient if said validity criteria is met;
    transports said printed substrate to be voided if said validity criteria is not met;
    dispenses the voided substrate to said recipient; and
    transports a replacement substrate for printing and reading in the event the validity criteria is not met for the previous printed substrate.

11. A printer in accordance with claim 10, wherein said transport transports said printed substrate back to said print module, if necessary, to be voided.

12. A printer in accordance with claim 11, wherein said print module voids said substrate by printing voiding indicia thereon.

13. A printer in accordance with claim 11, wherein said transport is a bi-directional transport, and reverses direction to transport said substrate back to said print module.

14. A printer in accordance with claim 10, further comprising:
    an alarm module adapted to provide an alarm in the event a printed replacement substrate does not meet said validity criteria.

15. A printer in accordance with claim 10, wherein if said printed replacement substrate does not meet said validity criteria:
    said transport transports the printed replacement substrate to be voided and dispenses the voided replacement substrate to said recipient.

16. A printer in accordance with claim 15, wherein an alarm is generated when a voided replacement substrate is dispensed.

17. A printer in accordance with claim 15, wherein:
    said read module re-reads at least one of said substrate or said replacement substrate prior to voiding; and said transport dispenses the re-read substrate to said recipient as a valid substrate if the validity criteria is met upon the re-reading.

18. A printer in accordance with claim 17, wherein:

the portion of said indicia which is read to test the validity criteria comprises a bi-directional code; and the re-reading is performed by the read module in an opposite direction than that used for the initial reading of the indicia.

19. A printer in accordance with claim 10, wherein said printed replacement substrate is dispensed to said recipient if it meets said validity criteria.

20. A printer in accordance with claim 10, further comprising:

a notifying module for providing notification to said recipient to wait for said replacement substrate if a voided substrate is dispensed.

21. A printer in accordance with claim 20, wherein said notifying module causes said notification to be printed on said voided substrate.

22. A printer in accordance with claim 20, wherein said notifying module provides said notification on a display.

23. A printer in accordance with claim 10, wherein said print module comprises a thermal print head and said substrate comprises thermal print paper.

24. A printer in accordance with claim 10, wherein said printed substrate is a wagering ticket or voucher.

25. A printer in accordance with claim 10, wherein said read module comprises a bar code reader.

26. A method for printing and validating a document, comprising the steps of:

printing said document;

reading at least a portion of said document to test a validity criteria, and in response to said test:

dispensing said document to a recipient if said validity criteria is met, and voiding said document if said validity criteria is not met.

\* \* \* \* \*

UNITED STATES PATENT AND TRADEMARK OFFICE
CERTIFICATE OF CORRECTION

PATENT NO. : 6,498,655 B1 Page 1 of 1
APPLICATION NO. : 09/872782
DATED : December 24, 2002
INVENTOR(S) : Brooks et al.

It is certified that error appears in the above-identified patent and that said Letters Patent is hereby corrected as shown below:

Column 10 - cancel claim 26

Signed and Sealed this

Thirty-first Day of July, 2007

JON W. DUDAS
*Director of the United States Patent and Trademark Office*